United States Patent [19]

Marchetti

[11] Patent Number: 4,473,150
[45] Date of Patent: Sep. 25, 1984

[54] CARTON SUPPORTING AND ADVANCING BASE IN A MACHINE FOR CLOSING AND/OR SEALING PARALLELEPIPEDAL CARTONS

[76] Inventor: Augusto Marchetti, Piazza Sicilia, 7 - 20146 Milano, Italy

[21] Appl. No.: 336,019

[22] Filed: Dec. 30, 1981

[30] Foreign Application Priority Data

Oct. 27, 1981 [IT] Italy ................... 23316/81[U]

[51] Int. Cl.³ .......................................... B65G 15/10
[52] U.S. Cl. .................................. 198/817; 198/861
[58] Field of Search ............... 198/611, 817, 836, 860, 198/861

[56] References Cited

U.S. PATENT DOCUMENTS

| | | | |
|---|---|---|---|
| 3,353,652 | 11/1967 | Fellner, Jr. ................... | 198/611 |
| 3,549,003 | 12/1970 | Jacobson ........................ | 198/861 |
| 3,581,878 | 6/1971 | Jacobson ........................ | 198/861 |
| 3,820,650 | 6/1974 | Garvey ........................... | 198/860 |
| 3,934,707 | 1/1976 | Bowman ......................... | 198/817 |

FOREIGN PATENT DOCUMENTS

| | | | |
|---|---|---|---|
| 2459195 | 2/1981 | France ........................... | 198/817 |
| 561695 | 6/1977 | U.S.S.R. ........................ | 198/860 |

*Primary Examiner*—Joseph E. Valenza
*Assistant Examiner*—Daniel R. Alexander
*Attorney, Agent, or Firm*—McAulay, Fields, Fisher, Goldstein & Nissen

[57] ABSTRACT

A conveying unit with coplanar and parallel conveyor belts is located inside a peripheral frame formed by a pair of longitudinal side members and by a pair of end cross members. The conveying unit is supported at the ends by support brackets extending longitudinally from the end cross members of the frame below the conveyor belts and in intermediate position therebetween. Detachable plates cover the spaces between the sides of the conveying unit and the longitudinal side members of the frame.

2 Claims, 6 Drawing Figures

CARTON SUPPORTING AND ADVANCING BASE IN A MACHINE FOR CLOSING AND/OR SEALING PARALLELEPIPEDAL CARTONS

FIELD OF THE INVENTION

The present invention relates to a carton supporting and advancing base in a machine for closing and/or sealing parallelepipedal cartons.

The machines designed to close and/or seal automatically parallelepipedal cartons include a base, on which the cartons are laid and advanced through areas acted on by suitable closing and/or sealing devices.

BACKGROUND OF THE INVENTION

The known bases are usually constituted by a substantially rectangular peripheral frame, which is provided with one or more bearing legs and carries in its interior a succession of transversal parallel rollers defining a bearing surface for cartons.

On the other hand, in many cases, there are provided special conveying units for advancing cartons with coplanar and parallel conveyor belts which are included in a suitable space inside the roller succession, in such a way as to allow the conveyor belts to engage the carton bottom. These units are usually supported laterally by suitable longitudinal section irons fixed to the frame, while the spaces between the irons and the longitudinal side members of the frame are filled with respective successions of transversal rollers of reduced length.

In the present machines of this type there exists the problem of replacing the conveyor belts when they are worn. At such time, in fact, it is necessary to detach the unit from the rest of the base, opening at this end the relative electric and pneumatic connections. Obviously, this requires considerable time, that reflects on the machine's productivity and consequently on the production costs.

OBJECTS AND SUMMARY OF THE INVENTION

The object of the present invention is to realize a base of this type, in which the conveyor belts of the conveying unit are replaceable without any necessity of removing temporarily the whole unit.

According to the invention, this object is realized by a base comprising a substantially rectangular peripheral frame formed by a pair of longitudinal side members and by a pair of end cross members and a conveying unit with coplanar and parallel conveyor belts inserted in the inside of said frame in such a position as to allow the conveyor belts to engage the carton bottom from below for the support and advancement thereof, wherein the conveying unit is supported at the ends, below and in an intermediate position between said conveyor belts, by support brackets extending longitudinally from the end cross members of the frame, while detachable plates cover the spaces between the two sides of said unit and said longitudinal side members of the frame.

In other words, the usual lateral supports of the conveying unit are replaced by end supports, which do not obstruct the lateral removal of the belts, while the shorter rollers usually placed between the sides of the same unit and those of the frame are in their turn replaced by demountable plates, the removal of which makes possible direct access to the sides of the conveying unit for the lateral removal of the belts and their substitution without any necessity of removing the whole unit. The resulting working advantages are certainly evident.

BRIEF DESCRIPTION OF THE DRAWINGS

An exemplary embodiment of the base according to the invention is illustrated in the enclosed drawings, in which.

DISCLOSURE OF PREFERRED EMBODIMENTS

Figure 2:
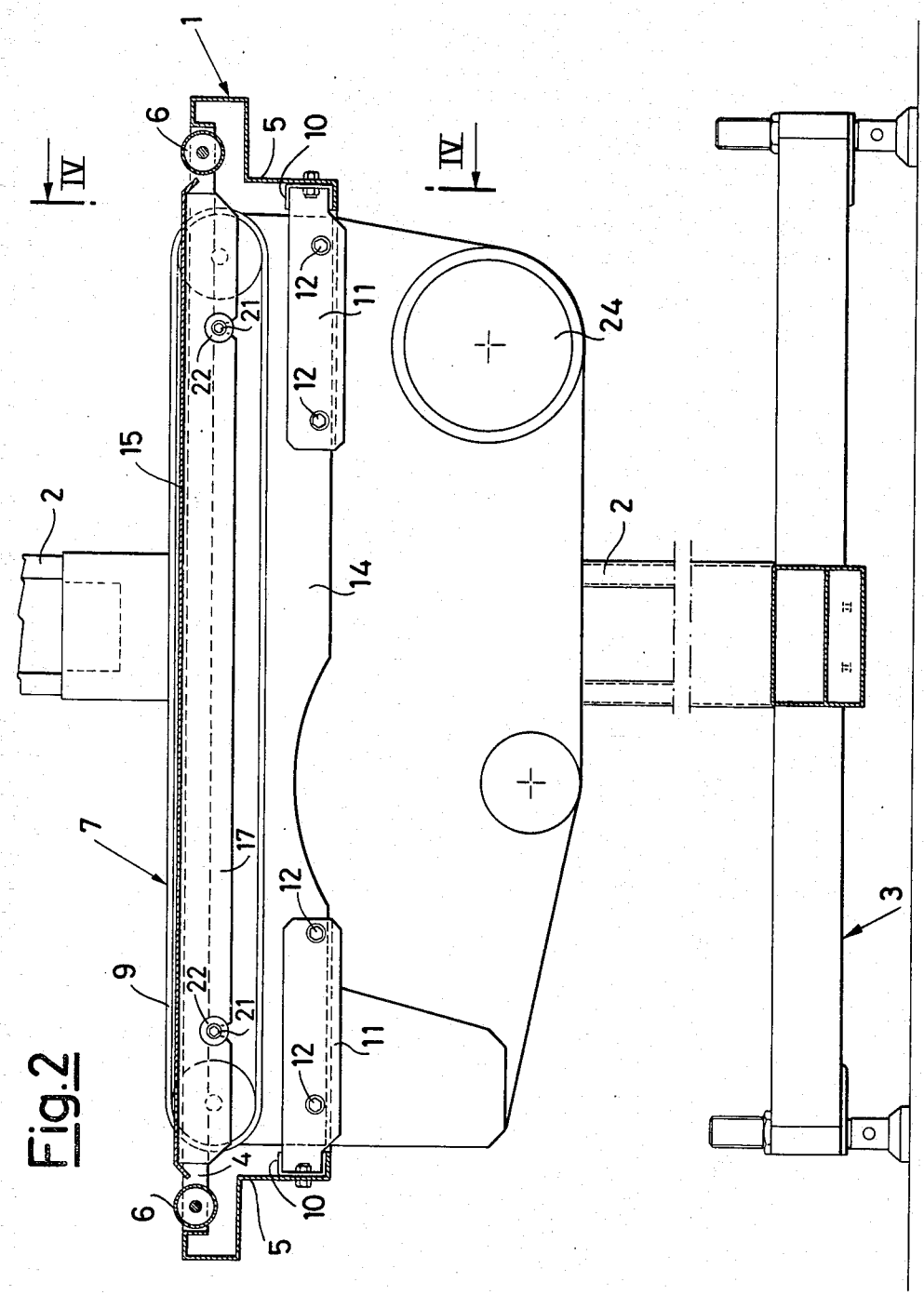
FIG. 2 shows the base in longitudinal section taken along line II—II of FIG. 1.

The base shown in the drawings comprises a peripheral frame 1, of rectangular shape, which is supported by a pair of lateral uprights 2, in their turn supported by a support 3 (FIG. 2).

Figure 1:
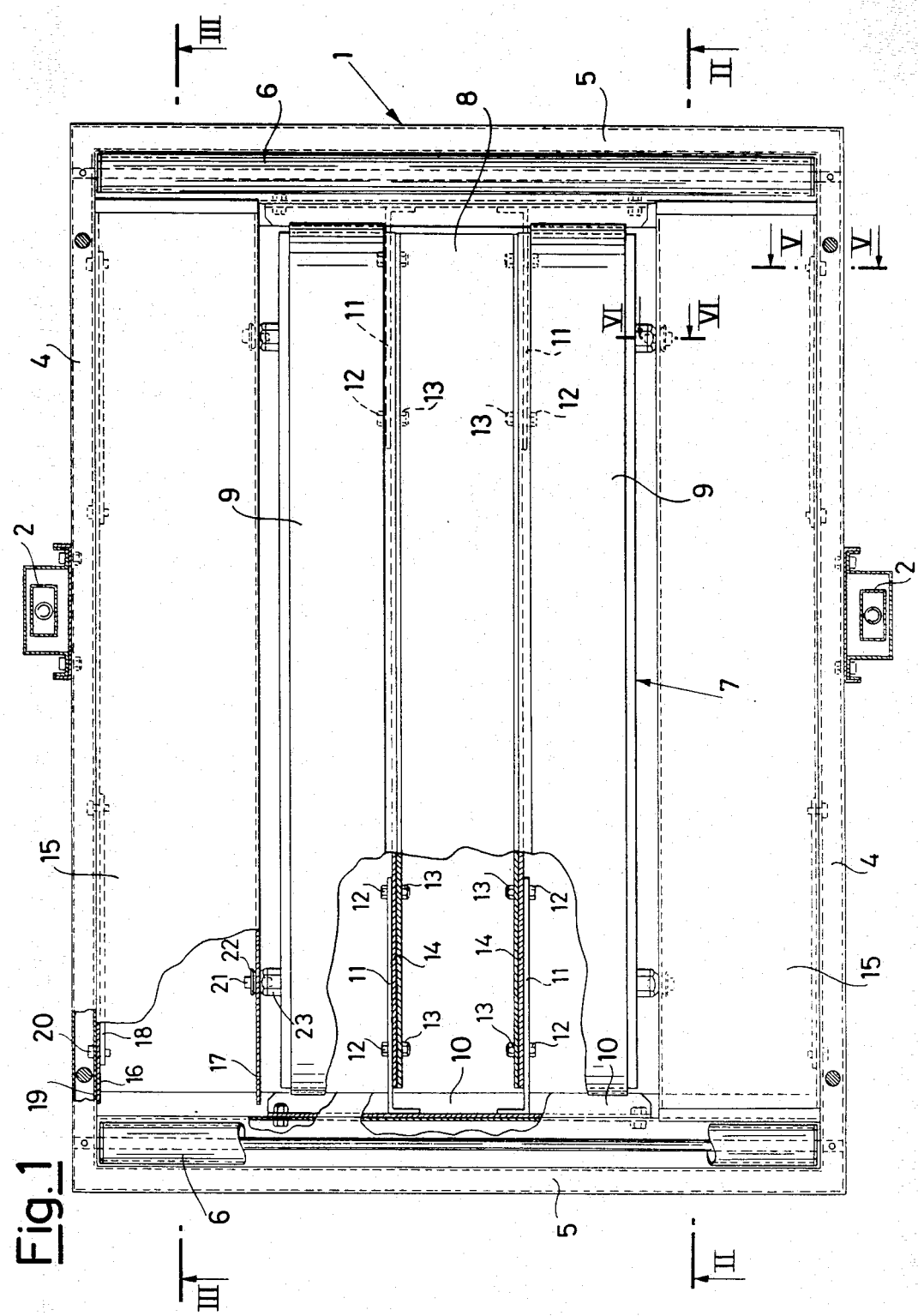
FIG. 1 shows the base in top plan view, with sectioned parts to emphasize important elements thereof.

The frame 1 is constituted (FIG. 1) by a pair of longitudinal side members 4 and by a pair of end cross members 5, near which two transversal rollers 6 are idly supported by the side members 4.

In the space defined between the two rollers 6 there is inserted in the inside of the frame 1 a conveying unit 7, the outline of which is represented in parallelepipedal shape at 8 (FIGS. 1 and 4) and comprises as conveying means two coplanar and parallel closed-loop conveyor belts 9 mounted on the body of the unit 7 so that they can be extracted by lateral sliding towards the outside. The two upper lengths of the two conveyor belts define a horizontal plane, on which a carton bottom can be laid for frictional engagement with the above mentioned belts. The rotary movement of the belts, suitably controlled by a motor 24 (FIG. 4), can thus cause the carton advancement from one end to the other of the base for its passage through one or more closing and/or sealing areas. Particularly, in the considered example, the base is associated with a tappping machine and the conveying unit is also designed to comprise suitable taping means.

For the support of the conveying unit 7, there are fixed to the two end cross members 5, parallel to them, two C-section irons 10 (FIGS. 1 and 2), from each of which there extend longitudinally towards the inside of the frame 1 two parallel brackets 11, to which there are fixed by screws 12 and nuts 13 the same number of longitudinal ribs 14 projecting from the conveying unit 7 downwards and in an intermediate position between the two parallel belts 9. That is, the ribs 14 and the relative support brackets 11 are disposed in such a way that they do not obstruct the lateral removal of the belts for their replacement, when it is required.

The lateral spaces between the two sides of the conveying unit 7 and the corresponding side members 4 of the frame 1 are finally filled and covered by a pair of plates 15, which are at a level slightly lower than that of the upper run of the belts 9 so that they do not interfere with carton advance and at the same time operate as a support in case of possible lateral sliding of the same cartons.

Figure 3:
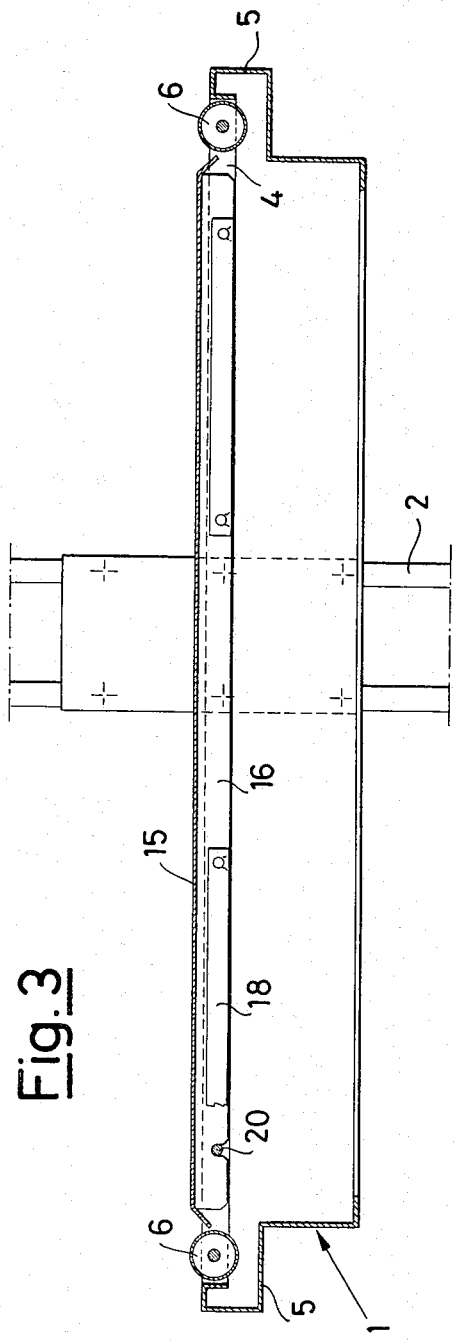
FIG. 3 shows the base in longitudinal section taken along line III—III of FIG. 1.
Figure 6:
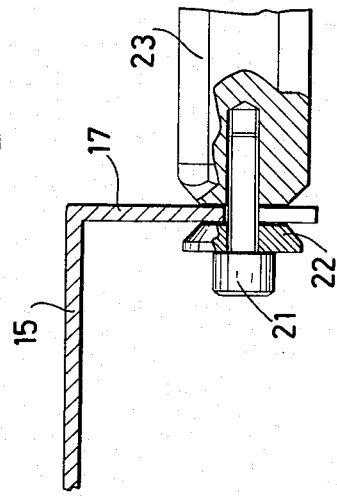
FIG. 6 shows another point of attachment of the same plate in section along line VI—VI of FIG. 1.
Figure 5:
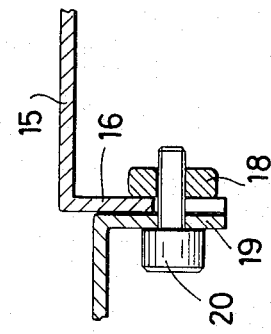
FIG. 5 shows the enlarged particular of a point of attachment of one of the two demountable plates of the base illustrated in the previous Figures, along line V—V of FIG. 1.
Figure 4:
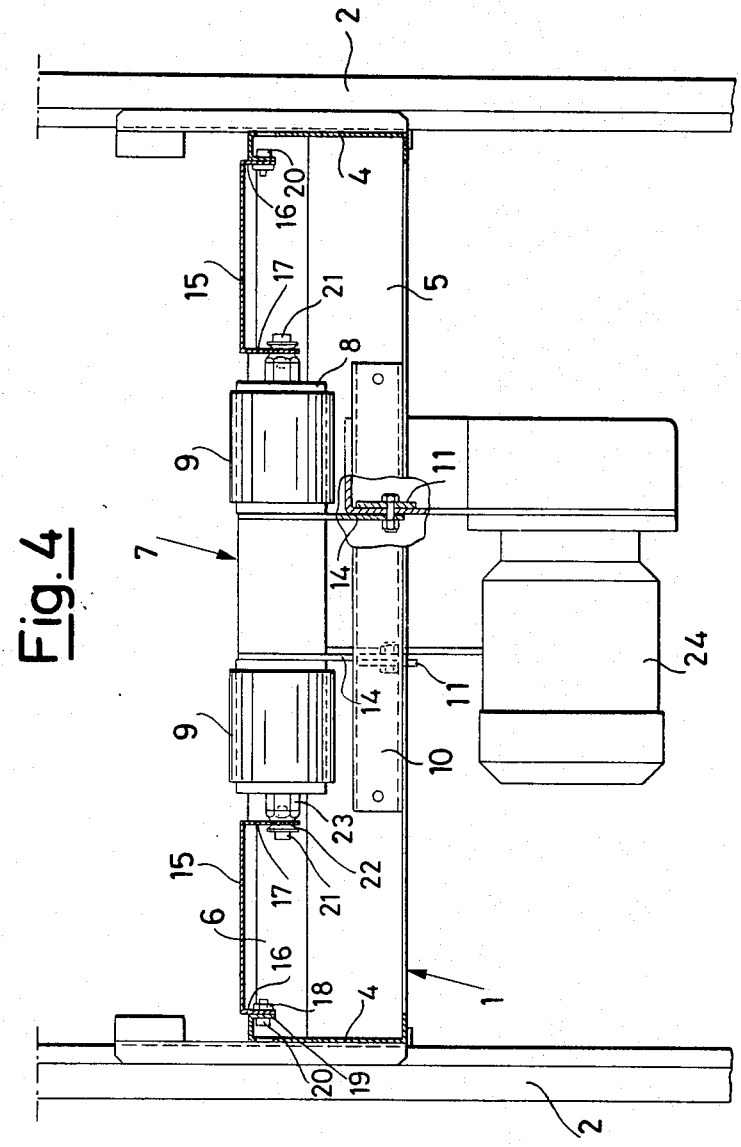
FIG. 4 shows the base in transversal section taken along line IV—IV of FIG. 2.

For the fastening of the plates 15, the latter are provided with lateral flaps 16 and 17 (FIG. 4), the first of which, provided with reinforcing plates 18 (FIG. 3), mates a corresponding flap 19 of the adjacent side member 4 and is fixed thereto by screws 20 (FIGS. 3, 4 and 5), while the second one is mounted astride screws 21 provided with washers 22 and screwed into studs 23 projecting transversally from the adjacent side of the conveying unit 7 (FIGS. 2, 4 and 6).

It is evident that, by simply taking off the screws 20 and 21, it is possible to remove the plates 15 and in this way to approach to the conveyor belts 9 and to withdraw them laterally from the conveying unit without any necessity of disassembling the whole unit. The replacement of the belts in this way is easy and fast.

I claim:

1. A carton supporting and advancing assembly for a machine for closing and/or sealing parallelepipidal cartons, comprising:
    a substantially rectangular peripheral frame formed of a pair of longitudinal side members and a pair of end members;
    a conveying unit in said frame;
    lateral spaces between said unit and said side members;
    said unit including coplanar and parallel, driven, spaced, conveyor belts;
    said belts being mounted on said unit and removable therefrom by lateral sliding toward said side members;
    end support brackets extending longitudinally from said end members and connected to corresponding ends of said unit below and intermediate said belts to support said unit in said frame, while leaving said belts laterally removable from said unit without dissembling the whole of said unit;
    a pair of detachable horizontal plates mounted between the sides of said conveying unit and said side members of the frame at a level below that of said belts to cover said lateral spaces between said unit and said side members while allowing said belts to be withdrawn laterally from said unit upon removal of said plates.

2. The assembly of claim 1, wherein said plates each have a pair of lateral flaps and said side members have adjacent complementary flaps, said complementary flaps being removably secured to said lateral flaps.

* * * * *